United States Patent
Stanley et al.

[11] Patent Number: 5,373,688
[45] Date of Patent: Dec. 20, 1994

[54] NUT HARVESTER WITH DUAL DEBRIS EXHAUSTS ON A SINGLE FAN

[75] Inventors: Glenn A. Stanley, Durham; Robert J. Sousa, Chico, both of Calif.

[73] Assignee: Weiss-McNair, Inc., Chico, Calif.

[21] Appl. No.: 201,415

[22] Filed: Feb. 24, 1994

[51] Int. Cl.$^5$ ............................................. A01D 51/00
[52] U.S. Cl. ..................................................... 56/328.1
[58] Field of Search ..................... 56/328.1, 13.1, 13.2, 56/13.3, 12.9, 16.5, 327.1, DIG. 8

[56] References Cited

U.S. PATENT DOCUMENTS

| | | | |
|---|---|---|---|
| 3,212,247 | 10/1965 | Erickson | 56/13.1 X |
| 3,579,969 | 5/1971 | Richter, Jr. | 56/328.1 |
| 4,035,993 | 7/1977 | Bell et al. | 56/13.1 |
| 5,001,893 | 3/1991 | Stanley et al. | 56/328.1 |

*Primary Examiner*—Stephen J. Novosad

[57] ABSTRACT

A first and a second debris outlet on a fan housing having a single fan and single intake or suction opening on a nut harvester. The nut harvester being of the type having structure for picking nuts up from the ground and depositing the nuts onto a moving open conveyor chain to carry the nuts for deposit into a storage container. The harvester includes a debris removal system including the fan within the fan housing connected to intake ducting positioned to draw air through the open conveyor chain to draw debris from the nuts into the fan housing to be exhausted out onto the ground. The first and second debris outlets are positioned on opposite sides of the fan housing from one another, approximately 180 degrees apart, and positioned so that debris is discharged to the two oppositely disposed sides of the harvester. The present invention provides an arrangement for exhausting debris quickly after it enters the fan housing by way of greatly reducing the distance the debris must travel prior to being exhausted through the nearest debris outlet, and this provides less clogging and more consistent air drawing, and thus improved debris removal from the nuts. Additionally, the debris exhaust air stream is divided by two, resulting in less dust being created.

2 Claims, 3 Drawing Sheets

NUT HARVESTER WITH DUAL DEBRIS EXHAUSTS ON A SINGLE FAN

BACKGROUND OF THE INVENTION

1. Field of the Invention

The present invention is an improvement to nut harvesters generally of the type of harvester taught in our earlier U.S. Pat. No. 5,001,893 issued Mar. 26, 1991. The improvement taught in the present disclosure involves the use of multiple debris discharge openings in a single fan housing of the air moving system used to remove debris from the nuts as they are picked up from the ground.

2. Description of the Prior Art

Modern nut harvesters or nut pick-up machines which lift nuts (agricultural items) from the ground in an orchard of trees for deposit into a container such as a trailer or large box, typically use suction fans and ducting to draw air through open conveyor chains on which the nuts are deposited immediately after being lifted from the ground. The air drawn through the open conveyor chain lifts dirt, leaves, small stick and like debris into the ducting system, and thus separates the unwanted debris from the nuts. The debris is carried through the ducting to the suction fan and fan housing wherein the air and debris is moved from the suction side of the system to the pressure or exhaust side of the system to be ejected through a single exhaust duct of the fan housing out onto the ground.

Normally, for reasons pertaining to cost of manufacture, number of parts to be serviced, power consumption (fuel), and simplicity of operation and control, most modern nut pick-up machines utilizes only a single and relatively large debris removal fan contained in a fan housing having a single intake (suction) duct and a single exhaust duct on the fan housing on the harvester. Some nut harvesters of the past have used multiple debris suction fans and multiple fan housings, an arrangement which has significant drawbacks compared to the use of a single fan typical of more modern pick-up machines. Additionally, most all nut harvesters eject the debris to one side of the harvester, with this being to aim the debris away from the front of the harvester where the driver or towing tractor is positioned, and away from the nuts which have already been cleaned and deposited in a storage container positioned at the rear of the harvester.

The use of a single exhaust duct or outlet from the fan housing on such harvesters has been found to have a number of problems which the present invention solves.

One of the significant problems associated with the use of a single exhaust duct on a debris removing fan is a high amount of wear on the fan and fan housing. This wear is the result of some of the debris entering the fan housing a substantial distance from the exhaust outlet, and therefore the debris remains within the housing an extended period of time while it travels the extended distance toward the exhaust outlet. The debris, being highly abrasive, wears the expensive housing and fan, and the longer period of time the debris remains in the housing, and the longer the distance the debris must travel within the housing to the exhaust duct, the greater amount of wear the debris applies to the fan and fan housing. It would be desirable to have the fan and fan housing last as long as is possible since the servicing or replacing of these components costs time and money, and therefore adds to the overall cost of harvesting.

Another of the significant problems associated with the use of a single exhaust duct on a debris removing fan housing is the tendency for the debris, particularly wet debris, to cause clogs or clogging, usually in the bottom of the housing. Such clogging can greatly reduce the ability of the incoming debris to be ejected from the housing, and once a clog begins, it oftentimes becomes rapidly worse, leading to the harvester needing to be stopped and the fan housing opened and cleaned out. This cleaning of the fan housing costs time, and therefore is undesirable. Additionally, the clogging, depending on the severity thereof, may go unnoticed by the operator for a period of time. The clogging can lead to higher back-pressure and reduced air movement (suction) through the conveyor chain on which the nuts are carried, and this can lead to an excessive and undesirable amount of debris remaining in the nuts when they are deposited into a storage container. The problem with clogging is in part related to the time and distance the debris remains and travels within the fan housing, as the debris, particularly when wet, can be heavy and sticky, and can lose some of its velocity prior to being ejected out the exhaust duct. It is always desirable to have as much of the debris removed from the nuts as is possible prior to the nuts being deposited into the storage container, and to this end, the suction applied to the chain on which the nuts are conveyed is normally initially set at a maximum strength, being just slightly less than what would draw the nuts themselves into the debris removal fan. Only a small amount of build-up or clogging in the fan housing will lead to increased back-pressure and thus reduced suction applied over the conveyor chain, and thus a greater amount of debris left in the nuts when they are deposited in the storage container. Nuts are normally purchased by weight and quality, and cleanliness is a quality aspect, and an excessive amount of debris remaining in the nuts will lead to the purchaser paying significantly less per weight unit. Therefore, it can be appreciated that constant and predictable air drawing through the conveyor chain and nuts thereon is highly desirable for proper cleaning.

Another of the problems associated with the use of a single exhaust duct on a debris removing fan is the excessive back-pressure which is normally overcome by use of a substantially large fan. The inability of a debris removal fan to rapidly exhaust air effects its ability to create suction on the open conveyor chain which can lead to an excessive amount of debris remaining in the nuts. The ability of a debris removal fan to exhaust air is effected by a number of factors such as size of exhaust outlet relative to fan and intake duct size, R.P.M. of the fan, and whether any clogs or clogging has accumulated in the fan housing or exhaust duct. Generally, the larger the fan, the higher the cost of manufacture thereof, and the greater amount of power (fuel) needed to operate the fan, and so it would be desireable to use a smaller fan to achieve the same results as a larger fan when possible.

Another of the problems associated with the use of a single exhaust duct on a debris removing fan, and one which is receiving increasing attention, includes an excessive amount of dust which may be created by high volumes of rapidly moving exhaust air throwing dust and debris into the air or striking the ground and creating dust clouds. The amount of dust is of course dependent upon whether the ground is dry or moist. Harvesting during dry weather is normally preferred, although the rains sometimes come early, requiring wet nuts to be picked up. When harvesting in dry weather, high volumes of dust, or dust clouds serve no useful purpose, and it is becoming increasingly clear that orchard dust can pose health problems for humans as well as for the orchard trees. Such clouds of dust can blow a significant distance, and can invade nearby homes and can be taken into the lungs. Many believe such dust is harmful. Additionally, blowing dust can carry disease from tree to tree, or from orchard to orchard.

Therefore, there is a need for further improvement in nut pick-up machines, and particularly in the portion which utilizes air movement for removing the debris.

SUMMARY OF THE INVENTION

The present invention is an improvement to nut harvesters or pick-up machines generally of the type, but not limited to, the type of harvester taught in our earlier U.S. Pat. No. 5,001,893 issued Mar. 26, 1991 to us, G. A. Stanley and R. J. Sousa. The harvester of our U.S. Pat. No. 5,001,893 teaches a nut pick-up machine or harvester having structure for moving through an orchard for picking nuts up from the ground and depositing the nuts onto an open conveyor chain to carry the nuts rearward to be deposited into a storage container, which is common to all harvesters of this nature. The harvester also includes a debris removal system including a single rotary fan within a fan housing, with the fan housing connected to intake ducting (suction) positioned to draw air through the open conveyor so as to draw debris from the nuts into the fan housing to be exhausted out through a single exhaust duct or outlet of the fan housing. Although the harvester of our U.S. Pat. No. 5,001,893 is powered by the power-take-off (PTO) of a separate towing tractor, similar harvesters include an internal combustion drive engine, seat for an operator, and steering system mounted on the harvester, eliminating the towing tractor. The present invention is applicable to both towed or self-powered nut harvesters of the general nature taught in U.S. Pat. No. 5,001,893. Because the present invention was tested with good results on the harvester of our U.S. Pat. No. 5,001,893 which includes many features common to harvesters of this nature, our U.S. Pat. No. 5,001,893 is herein incorporated by reference for both essential and non-essential material.

The harvester of U.S. Pat. No. 5,001,893 has a single debris removal fan positioned with the rotational axis or axle of the fan extending generally horizontally and parallel to the lengthwise axis of the harvester, or extending from the front end of the harvester toward the back end thereof. The exhaust outlet of the fan housing is positioned relative to the harvester and rotational axis of the fan so that debris is exhausted to one side of the harvester, or transversely to the length of the harvester and the rotational axis of the fan. The debris enters the fan housing through the centrally positioned intake duct, and is immediately turned 90 degrees in its course, or moved radially outward from the rotational axis of the fan by the rotating blades of the fan. In the incorporated patent, it can be ascertained from the drawing figures that the debris exhaust outlet is at the bottom of the fan housing and to one side of the harvester, and further it can be seen that some of the debris entering the fan housing enters near the outlet, but just above the outlet so as to be required to essentially be carried about 360 degrees up and around within the circular fan housing by the counterclockwise rotating fan, so as to be able to be discharged out onto the ground through the existing exhaust outlet positioned in the side bottom end of the fan housing. This carrying of the debris for a significant time and distance within the fan housing is associated with several significant problems as hereinabove detailed.

The present invention solves many prior art problems by way of applying an additional debris outlet on the fan housing. This additional debris outlet is positioned on the opposite side of the fan housing, approximately 180 degrees around from the existing debris outlet. Additionally, when the rotational axis of the fan is horizontally disposed, the debris outlets are elevationally offset from one another, with one being positioned toward the upper or top side end of the fan housing, and the other being positioned near the lower or bottom side end of the fan housing. The positioning of the two exhaust outlets relative to one another, i.e. on oppositely disposed sides of the fan housing and elevationally offset, one being positioned high, and one being positioned low, provides an arrangement which maximizes the rate of expulsion of the debris from the housing of the single fan.

The present invention is also applicable to harvesters having the rotational axis of the debris fan vertically disposed, as opposed to being horizontally disposed as in the incorporated patent harvester. Although nut harvesters having the rotational axis of the debris fan vertically disposed are not as common as those with the axis horizontally disposed, the invention is still applicable thereto. When the present invention is applied to a fan housing enclosing a fan with the rotational axis thereof vertically oriented, the two debris outlets are positioned approximately 180 degrees apart, and each discharges to an opposite side of the harvester, but in this arrangement, the two discharge outlets are not elevationally offset, lying essentially in the same plane.

The present invention provides for exhausting debris much more quickly after it enters the fan housing by way of greatly reducing the distance the debris must travel prior to being exhausted through the nearest outlet. The nearest outlet is determined by the location at which the debris enters the fan housing, which is random.

With the use of multiple debris outlets in accordance with the present invention, the debris exhaust air stream is divided by two, with one half of the total output moving through each of the two outlets, resulting in less dust being created, even though the overall volume of air output is equal to or greater than that of the same fan housing having only a single exhaust outlet as in the prior art.

Therefore, it is an object of the present invention to reduce the amount of wear applied to the debris removal exhaust fan and fan housing of a nut harvester by debris.

A further object of the present invention is to reduce clogs or clogging in the debris removal fan housing of a nut harvester.

A further object of the present invention is to maintain low, constant and predictable back-pressure within the debris removal fan housing of a nut harvester so as to lead to better suction control and improved debris cleaning.

An even further object of the present invention is to reduce the amount of dust potentially created by the debris removal fan of a nut harvester for health and environmental reasons, by way of splitting the exhaust air stream into multiple lower volume streams directed to oppositely disposed sides of the harvester.

A still further object of the present invention is to meet the previously listed objects in a inexpensive or economical manner and structural arrangement.

BEST MODE FOR CARRYING OUT THE INVENTION

Figure 1:
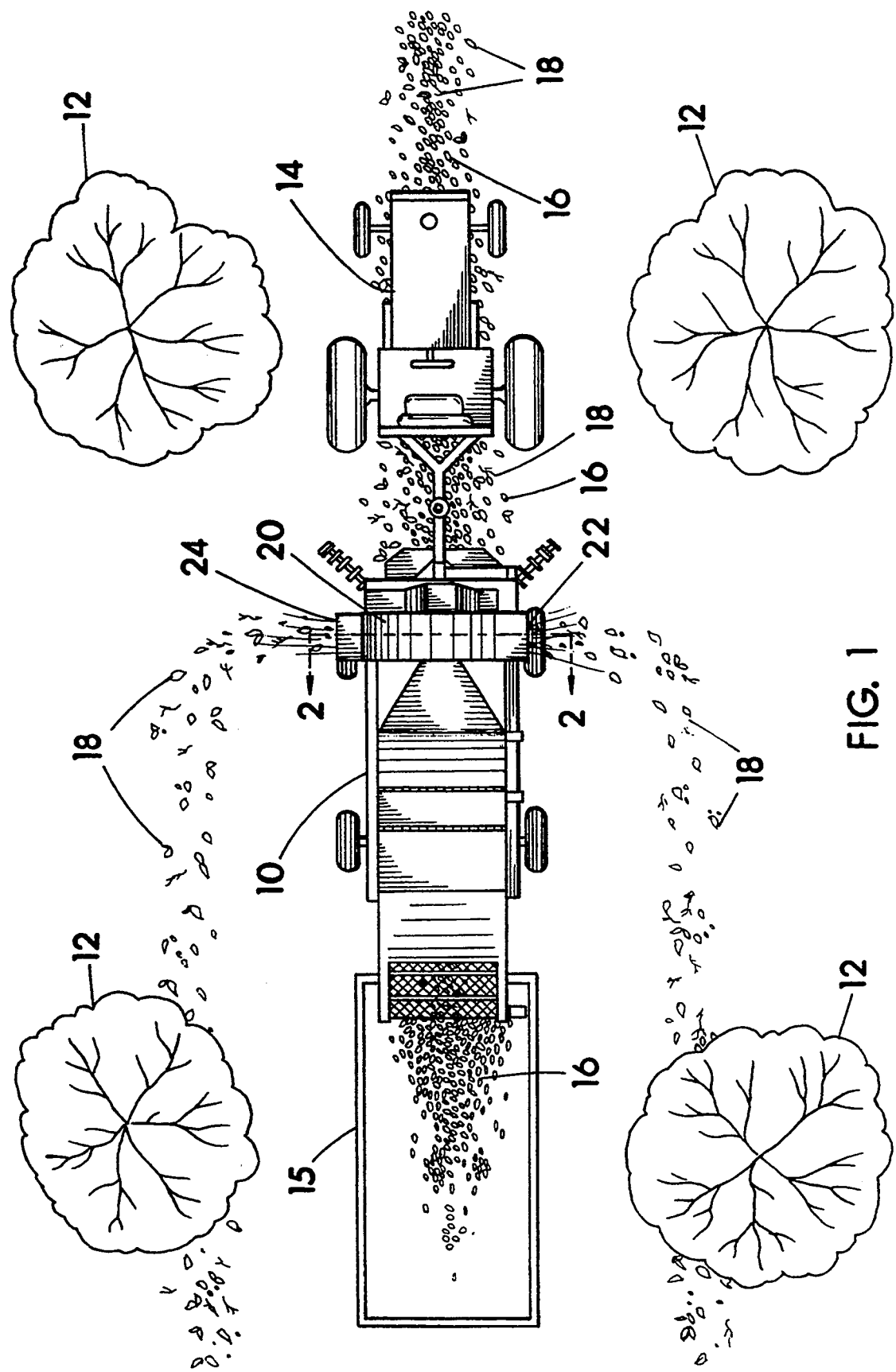
FIG. 1 is a view looking downward at the top of an operating nut harvester including a debris removal system in accordance with the present invention. Debris is shown being discharged from two oppositely disposed sides of the fan housing and harvester.

The following detailed description is of a best mode for carrying out the invention, and although there are clearly some changes which could be made to that which is specifically herein described and shown in the included drawings, for the sake of briefness of this disclosure, all of these changes which fall within the scope of the present invention have not herein been detailed, but will be apparent to those skilled in the art. Referring now to the drawing figures in general wherein FIG. 1 is a view looking downward at the top of an operating nut harvester 10 in a orchard of trees 12, with the harvester 10 including an air moving debris removal system in accordance with the present invention. Harvester 10 is shown being towed by a tractor 14 over a windrow of a mixture of nuts 16 and debris 18. Debris 18 is shown being discharged from two oppositely disposed sides of the fan housing 20 and harvester 10, and nuts 16 are shown being deposited into a trailer 15.

Figure 2:
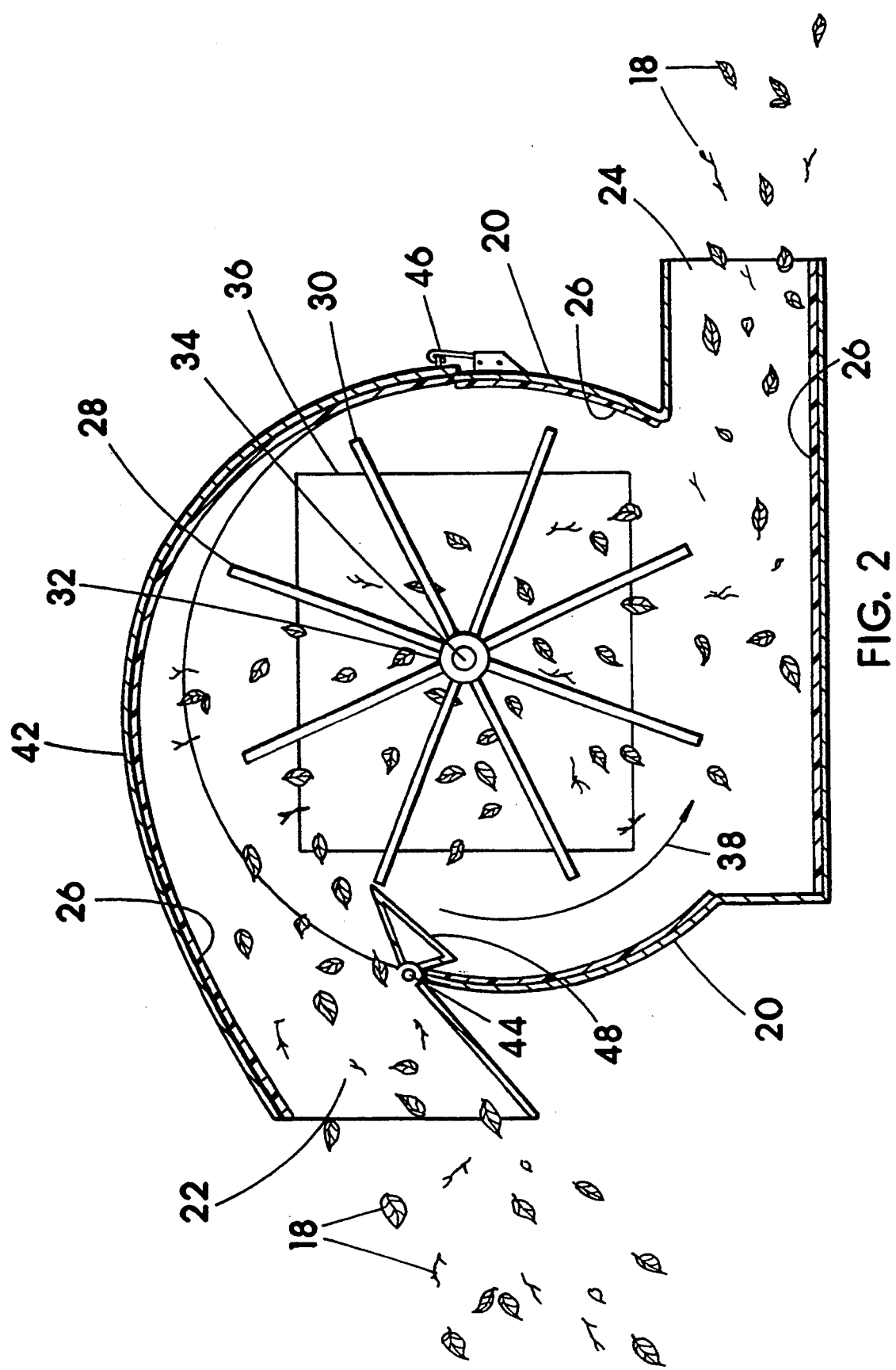
FIG. 2 is a cross-sectional few taken at line 2 of FIG. 1 of the fan housing with dual exhaust outlets in accordance with the present invention.
Figure 3:
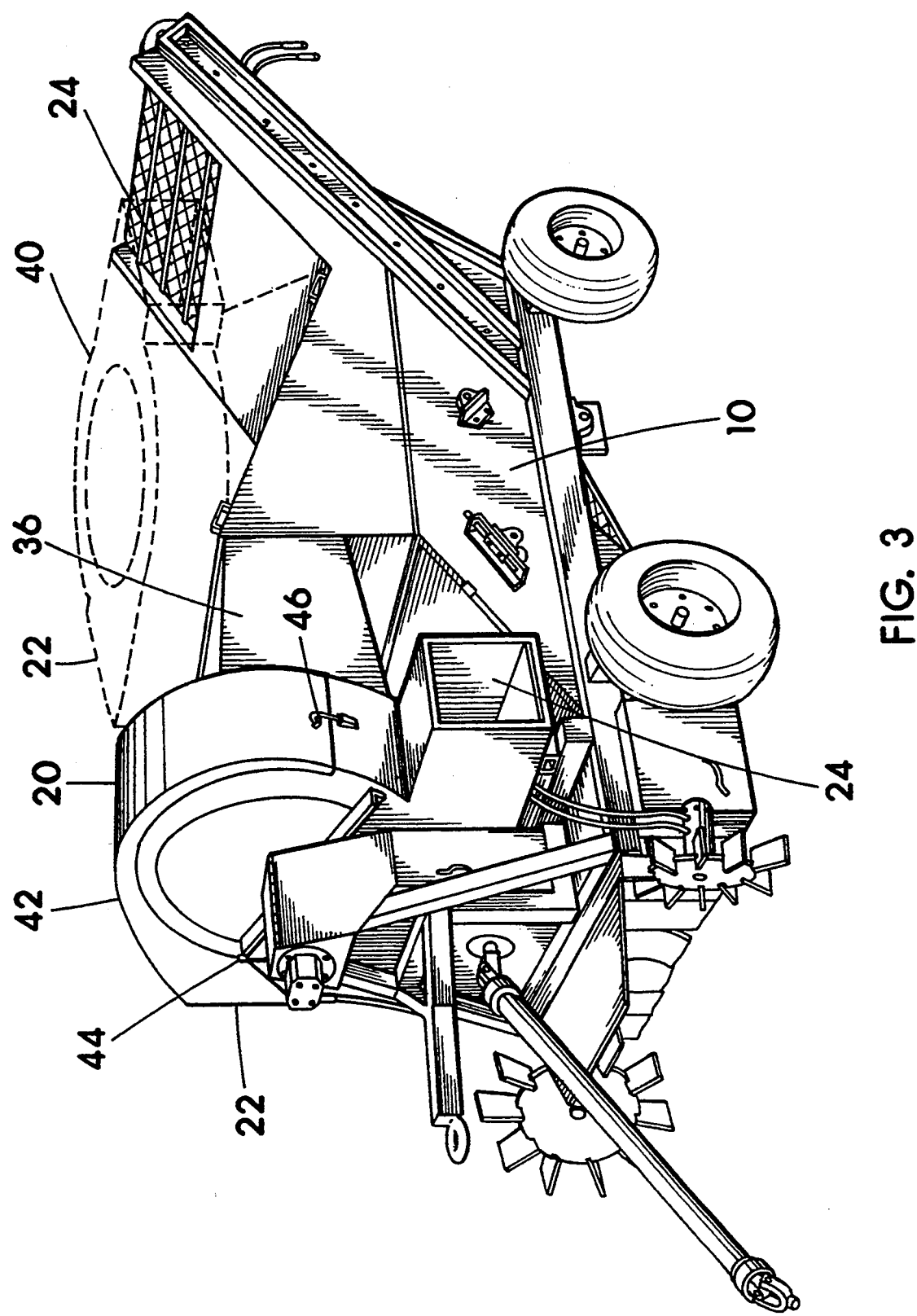
FIG. 3 is a front perspective side view of a harvester including a debris removal system in accordance with the present invention.

FIG. 2 is a cross-sectional few taken at line 2 of FIG. 1 of fan housing 20 with dual debris outlets; one debris outlet is designated 22, and the other debris outlet is designated 24. Fan housing 20 is preferably made of shaped sheet metal to essentially define a relatively close fitting enclosure, but could be made of other suitably strong materials, and normally would include an interior replaceable protective liner 26 made of rubbery or plastics material to aid in protecting the housing 20 from wear by debris. The protective liner 26 is typically affixed by adhesives or rivets to surfaces against which debris is thrown during its travel within fan housing 20 toward an exhaust outlet 22 or 24. Liner 26, if used, will extend the life of housing 20, however liner 26 itself wears-out and is not inexpensive to replace. Also shown in FIG. 2 is the rotary debris suction fan 28 generally comprising multiple blades 30 connected to center hub 32 which is affixed on the fan axle 34. Axle 34 is rotatable by a drive belt or motor connected thereto, the specific rotary drive mechanism and axle support being unimportant to the present invention, and in the incorporated patent, fan 28 is rotated by a belt powered by the power-take-off unit of the towing tractor 14. Additionally shown in FIG. 2 is a rectangular intake duct 36 connected to or entering the back of fan housing 20. The intake duct 36 extends from the fan housing to over the open conveyor chain so as to be able to draw debris from the nuts on the chain during operation. In the example shown in FIG. 2, fan 28 is rotating counterclockwise as indicated by movement direction arrow 38. The invention is applicable regardless of the rotational direction of fan 28, however, the outlets 22 and 24 must be placed (aimed) and shaped relative to the directional spin of the fan 28, as may be ascertained from FIGS. 1 and 2, so that the movement of the fan can throw debris radially outward and through one of the debris outlets 22 or 24, as can be appreciated by those who make harvesters having a fan housing having only one debris outlet. Proper placement of an exhaust outlet in a fan housing, as those skilled in the art know, and outlets 22 and 24 are no exception. Proper placement of outlets 22 and 24 involves placing the outlets off-center of the generally circular fan housing 20, and as shown in FIG. 2, outlet 22 is toward one edge of the generally circular fan housing 20, and outlet 24 is positioned toward the opposite edge so that debris sliding along the interior surface of fan housing 20 will essentially side out through one of the exhaust outlets 22 or 24. In FIG. 2, debris 18 is shown entering fan housing 20 through intake duct 36. Although FIG. 2 which is taken at line 2 of FIG. 1 shows or indicates axle 34 is horizontally disposed, as herein above mentioned, the invention is also fully applicable when axle 34 is vertically disposed as on some harvester designs. When the rotational axis of axle 34 is vertically disposed, outlets 22 and 24 shown in FIG. 2 would essentially lie in the same horizontal plane or in the same elevational plane. When the rotational axis of axle 34 is horizontally disposed specifically as indicated in FIG. 2 which is that which exists in FIG. 1, outlet 22 and 24 lie in two different elevational planes. In FIG. 3, a dotted outline at 40 on harvester 10 has been included to roughly indicate a fan in a fan housing on a harvester wherein the rotational axis and axle of the debris removal fan is vertically disposed, and a fan housing having dual debris exhausts in accordance with the present invention is utilized. The dotted outline at 40 indicates the two debris exhaust outlets 22 and 24 in accordance with the present invention to be lying in essentially the same plane and aimed toward the two oppositely disposed sides of the harvester as those skilled in the art will be able to appreciated at this point in reading this disclosure.

Fan housing 20 is essentially an enclosure in relatively close proximity around fan 28. In order to allow initial installation of fan 28 into housing 20 during manufacture, and to allow access to the interior of housing 20 and to fan 28 for servicing during the life of harvester 10, normal procedure is to install a hatch or door 42 on fan housing 20. In the example shown in FIGS. 1 and 2, door 42 is what in-part defines the top portion of housing 20, and mostly defines outlet 22 as may best be ascertained in FIG. 2. Door 42 is attached to the main body portion of housing 20 utilizing a hinging or hinge 44 arrangement, and at the opposite side of door 42 is a latch 46 with one portion of the latch 46 on the door 42 end, and the other portion of the latch 46 on the main body portion of housing 20 above outlet 24 as may be seen in FIGS. 2 and 3. The hinged attachment of door 42 allows the raising of the door upon unlatching of latch 46 for accessing the interior of fan housing 20.

A best shown in FIG. 2, attached adjacent hinge 44 is a baffle 48 extending inward toward blades 30 of fan 28. Baffle 48 ends just short of the distal ends of blades 30 so as to provide clearance allowing rotation of the fan 28 without it colliding with baffle 48. Baffle 48, which extends across the width of fan housing 20, serves to provide what is in essence a vacuum break, allowing for improved vacuum to be generated, and to cause debris above the baffle as may be seen in FIG. 2 to be forced out exhaust outlet 22. Baffle 48 improves the dividing of the air movement and thus exhausting of the air and debris within housing 20, and thus improves the dual debris exhaust principles of the invention, although the invention will function without baffle 48, baffle is preferred to maximize performance, and to more evenly split the exhaust air stream into two generally equal streams which will create less dust, and in aiding in exhaust the debris out the nearest exhaust outlet 22 or 24 to where the debris entered fan housing 20 through intake duct 36.

Although we have very specifically described the best mode and preferred structures of the invention, it should be understood that the specific details are given for example to those skilled in the art. Many changes in the specifics described may clearly be made without departing from the true scope of the invention.

What we claim is:

1. An improvement in a harvester of a type adapted for movement through an orchard of trees to pick-up agricultural items and debris mixed with the agricultural items on a ground surface, remove a portion of the picked-up debris from the agricultural items by way of a rotary fan within a fan housing connected to air intake ducting positioned to draw air through the agricultural items so as to draw debris from the agricultural items into said fan housing to be exhausted;

said improvement in said harvester including a combination of said fan positioned within said fan housing having a first debris outlet and a second debris outlet each for exhausting debris from said fan housing; said first debris outlet positioned to exhaust debris radially outward from the rotational axis of said fan and to a first side of the harvester, said second debris outlet positioned to exhaust debris radially outward from the rotational axis of said fan and to a second side of the harvester oppositely disposed from said first side of the harvester.

2. An improvement in a harvester of a type adapted for movement through an orchard of trees to pick-up agricultural items and debris mixed with the agricultural items on a ground surface, remove a portion of the picked-up debris from the agricultural items by way of a rotary fan within a fan housing connected to air intake ducting positioned to draw air through the agricultural items so as to draw debris from the agricultural items into said fan housing to be exhausted;

said improvement in said harvester including a combination of said fan positioned within said fan housing with the rotational axis of said fan generally horizontally disposed, said fan housing having a first debris outlet and a second debris outlet each for exhausting debris from said fan housing; said first debris outlet positioned to exhaust debris radially outward from the rotational axis of said fan and to a first side of the harvester, said second debris outlet positioned to exhaust debris radially outward from the rotational axis of said fan and to a second side of the harvester oppositely disposed from said first side of the harvester, said first and second debris outlets elevationally offset relative to one another in placement in said fan housing wherein said first debris outlet is generally elevationally below said rotational axis of said fan, and said second debris outlet is generally elevationally above said rotational axis of said fan.

* * * * *